United States Patent
Guthrie et al.

(10) Patent No.: US 7,371,432 B2
(45) Date of Patent: May 13, 2008

(54) PROCESS FOR MAKING A METAL-POLYMER COMPOSITE HAVING AN IRRADIATED POLYMER COATING

(75) Inventors: Joseph D. Guthrie, Murrysville, PA (US); Paul B. Schultz, Export, PA (US); Thomas L. Levendusky, Greensburg, PA (US); Bob Larsen, Knoxville, TN (US)

(73) Assignee: Alcoa Inc., Pittsburgh, PA (US)

( * ) Notice: Subject to any disclaimer, the term of this patent is extended or adjusted under 35 U.S.C. 154(b) by 281 days.

(21) Appl. No.: 10/721,484

(22) Filed: Nov. 25, 2003

(65) Prior Publication Data

US 2004/0214021 A1  Oct. 28, 2004

Related U.S. Application Data

(63) Continuation-in-part of application No. 10/038,266, filed on Oct. 29, 2001, now abandoned.

(51) Int. Cl.
- B05D 3/00 (2006.01)
- B05D 3/06 (2006.01)
- C08J 7/18 (2006.01)
- B65D 6/02 (2006.01)
- B65D 6/28 (2006.01)
- B65D 8/06 (2006.01)

(52) U.S. Cl. .............. 427/331; 427/551; 220/623; 220/622

(58) Field of Classification Search ............... 427/331, 427/551; 220/623, 62.2, 622
See application file for complete search history.

(56) References Cited

U.S. PATENT DOCUMENTS

| | | | |
|---|---|---|---|
| 3,647,520 A | 3/1972 | Gor et al. ............. 427/496 |
| 3,882,187 A | 5/1975 | Takiyama et al. ............ 260/835 |
| 4,044,187 A * | 8/1977 | Kremkau ................. 428/212 |
| 4,308,084 A * | 12/1981 | Ohtusuki et al. ............ 156/233 |
| 4,452,374 A * | 6/1984 | Hitchcock et al. ........ 220/62.12 |
| 4,945,008 A | 7/1990 | Heyes et al. .............. 428/458 |
| 4,957,820 A | 9/1990 | Heyes et al. .............. 428/458 |
| 5,100,708 A | 3/1992 | Heyes et al. .............. 428/458 |
| 5,407,702 A | 4/1995 | Smith et al. .............. 427/211 |
| 5,582,319 A * | 12/1996 | Heyes et al. .............. 220/62.22 |
| 5,595,705 A * | 1/1997 | Walton et al. .............. 264/456 |

(Continued)

FOREIGN PATENT DOCUMENTS

EP  0208261  1/1987

(Continued)

OTHER PUBLICATIONS

Montell Canada Inc. Material Safety Data Sheet for Pro-fax PF711 Modified Polypropylene Homopolymer Pellets—May 20, 1999.

*Primary Examiner*—William Phillip Fletcher
*Assistant Examiner*—Cachet I. Sellman
(74) *Attorney, Agent, or Firm*—Greenberg Traurig LLP; Mauri A. Sankus

(57) ABSTRACT

A process for making a metal-polymer composites suitable for shaping into container end panels having improved resistance to feathering and angel hair formation. A polymer coating is applied to a metal sheet. The polymer coating includes at least one cured polymer selected from polyolefins, anhydride modified polyolefins, epoxies, and phenoxies. The polymer coating on the composite is then irradiated with an electron beam, thereby scissioning chains in the cured polymer. The metal sheet preferably comprises an aluminum alloy and the polymer coating preferably comprises maleic anhydride modified polyropylene.

14 Claims, 1 Drawing Sheet

U.S. PATENT DOCUMENTS

| | | | |
|---|---|---|---|
| 5,753,328 A | 5/1998 | Miyazawa et al. | 428/458 |
| 5,814,395 A | 9/1998 | Soellaart-Roelofsen et al. | 428/460 |
| 5,881,534 A * | 3/1999 | Ahlqvist et al. | 53/403 |
| 5,919,517 A | 7/1999 | Levendusky et al. | 427/211 |
| 5,942,285 A | 8/1999 | Schmid et al. | 427/318 |
| 5,960,976 A | 10/1999 | Tsuno | 220/62.22 |
| 6,004,629 A | 12/1999 | Madigan | 427/496 |
| 6,030,710 A | 2/2000 | Nitowski et al. | 72/379.4 |
| 6,140,613 A | 10/2000 | Tsuno | 220/62.11 |
| 6,153,264 A | 11/2000 | Schmid et al. | 427/318 |

FOREIGN PATENT DOCUMENTS

| | | |
|---|---|---|
| FR | 2159807 | 6/1973 |
| JP | 63150330 | 6/1988 |

* cited by examiner

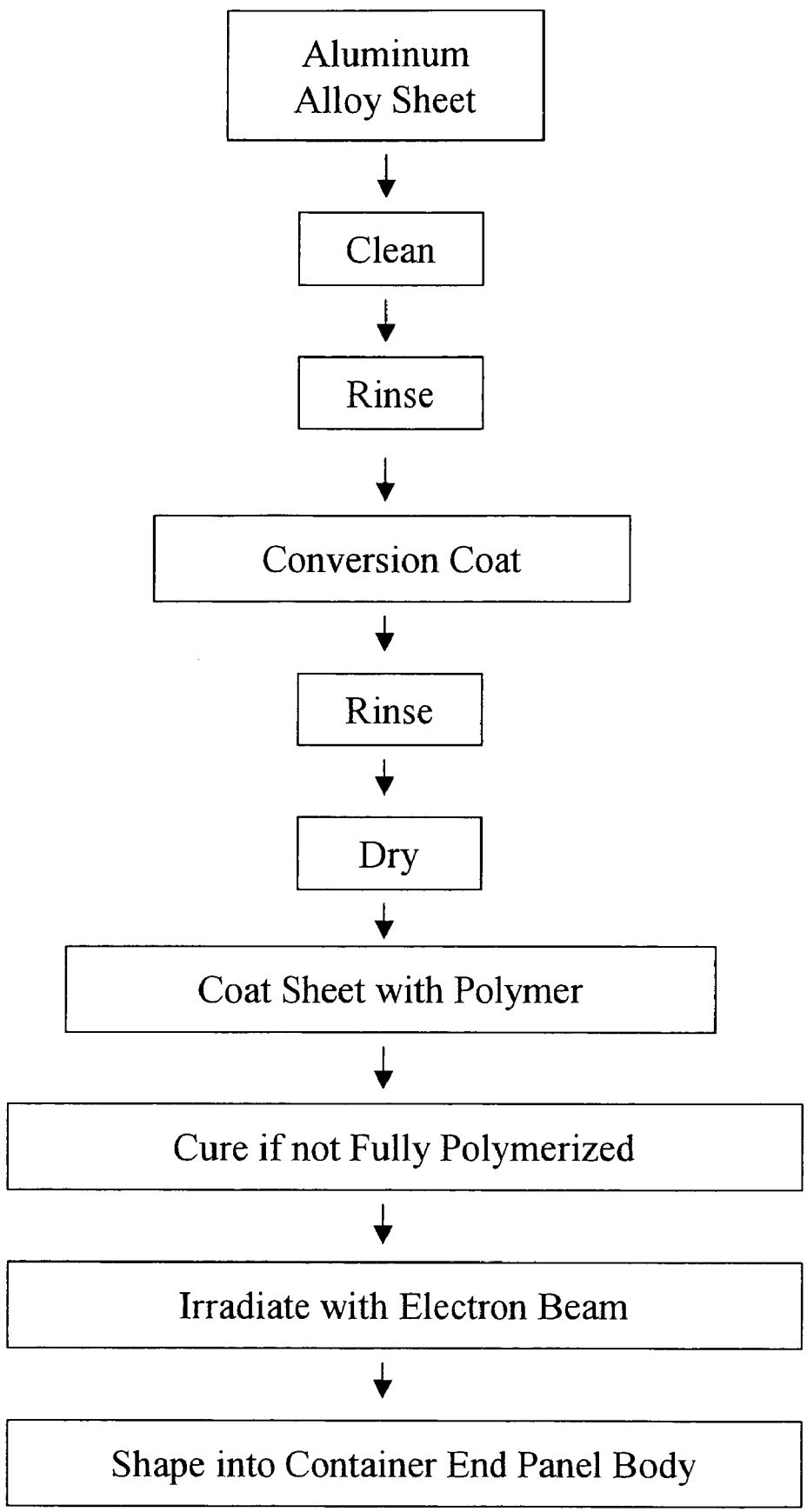

PROCESS FOR MAKING A METAL-POLYMER COMPOSITE HAVING AN IRRADIATED POLYMER COATING

PENDING RELATED APPLICATION

This application is a continuation-in-part of U.S. application Ser. No. 10/038,266 filed Oct. 29, 2001 now abandoned.

FIELD OF THE INVENTION

The present invention relates to a process for making a metal-polymer composite suitable for shaping into container bodies and container end panels for food and beverage containers. More specifically, the invention relates to a metal-polymer composite including a polymer coating having improved resistance to feathering and angel hair formation.

BACKGROUND OF THE INVENTION

Metal sheet coated with a thermoplastic resin on one or both sides has long been used for shaping into bodies and end panels for food and beverage containers. The coating is applied by a variety of processes including roll coating, reverse roll coating, spraying, electrocoating, powder coating, and lamination. Coatings are applied to the metal sheet in order to improve corrosion resistance, formability, and appearance.

Electron beam radiation is used in the prior art to cure a coating material after it has been applied to a substrate. "Curing" is a common name for the process in which an organic coating applied to a substrate is polymerized to or nearly to the maximum extent practical, and in addition, curing drives off of all or nearly all of the solvent if any is present. The curing of a coating may involve polymerization from monomers, or the chain lengthening (cross linking) of oligomers or polymers, or any combination thereof. The average molecular weight of the polymer chains is increased, and any solvents which might be present are largely driven off. Electron beam curing may be defined as the above curing process induced by electron beam irradiation. Solvents are frequently not present in electron beam cured formulations, and therefore are frequently not driven off in the curing process. In electron beam curing, the electron beam ionizes specific molecules, which initiate a free radical reaction in the uncured coating and causes polymer cross linking (increasing average polymer molecular weight). A typical example of electron beam curing is in U.S. Pat. No. 4,452,374, granted to Hitchcock et al. In this patent, the polymer coating is cured by "cross linking the (polymer) via the use of conventional high energy electron beam irradiation techniques". Many other examples exist in the patent literature and published references. However, the curing treatments are stopped when full polymerization is reached or approached. This is because added energy, whether thermal, electron beam, or other, will begin to break polymer bonds, shorten chain length, reduce average molecular weight, and deteriorate the coating properties if energy application is continued beyond the point of full polymerization. Such property deterioration may include embrittlement, loss of strength, adhesion failure, and or yellowing of the polymer coating. With no nearby reactive materials present to continue the polymerization process, application of added energy causes the polymers to simply undergo a scission process in which chains are shortened and average molecular weight decreases.

Polymer coatings which are applied as fully polymerized materials do not receive a curing step after they are applied to a metal substrate. In extrusion coating, a polymer which has already been fully polymerized is melted and extruded onto the metal surface. A small amount of additional heating may be used to assure that the molten polymer flows into microscopic porosity in the substrate, but no further polymerization takes place, and no additional heating or irradiation is applied to cure the coating, drive off solvents, or further polymerize the coating molecules. In powder coating, fully polymerized powdered polymers are applied to the substrate, and then heated to melt them into a coherent mass and induce adhesion to the substrate. Again, however, no further polymerization takes place, and no heating or irradiation is applied to cure the coating, drive off solvents, or further polymerize the coating molecules.

Coating processes most commonly used commercially at the present time require solvent based systems that generate vapors. In order to provide a more environmentally acceptable coating process not requiring any solvents, extrusion coating of thermoplastic polymers onto metal surfaces has been proposed. Some prior art patents disclosing extrusion coating onto metal include Smith et al. U.S. Pat. No. 5,407,702; Levendusky et al. U.S. Pat. No. 5,919,517; Hitchock et al. U.S. Pat. No. 4,452,374; and Schmid et al. U.S. Pat. Nos. 5,942,285 and 6,153,264.

Extrusion coated aluminum alloy sheet performs adequately for some purposes. However, the highly ductile nature of thermoplastic polymers leads to problems when the polymer coated sheet is formed into end panels for food and beverage containers. The first problem, called "feathering" or "membraning", occurs when the thermoplastic coating separates from the metal when a pull tab or stay on tab is opened. A thin sheet of the separated coating is visible, either partially covering the container spout or sticking out from the opened panel. A second problem is called "angel hair", in which polymer coating pushed into the score line on the end panel forms fine filaments when the end is opened, thereby creating an undesirable appearance. The fine filaments of coating are free to enter the container through the opening or to enter the consumer's mouth. Angel hair sometimes also forms at the peripheral edges of polymer coated metal disk blanks for can bodies and at the top edges of polymer coated can bodies.

Accordingly, there still remains a need to provide polymer coated metal sheet having improved resistance to feathering and angel hair formation when the coated sheet is shaped into container end panels.

A principal objective of the present invention is to provide a process for making a metal-polymer composite including a polymer coating having scissioned polymer chains in order to improve resistance to feathering and angel hair formation.

Some advantages of the invention are that the process is inexpensive, can be performed quickly, and is capable of being operated without generating pollutants.

Additional objectives and advantages of our invention will become apparent to persons skilled in the art from the following detailed description of some particularly preferred embodiments.

SUMMARY OF THE INVENTION

In accordance with the present invention there is provided a process for making a metal-polymer composite suitable for shaping into container bodies and container end panels for food and beverage containers. The composite includes a metal sheet and a polymer coating. The polymer coating preferably includes only a single layer, but may include 2 or more layers.

The metal sheet may comprise an aluminum alloy, steel, aluminum alloy-coated steel, or aluminum-coated steel. Aluminum alloy sheet is particularly preferred.

Aluminum alloys suitable for shaping into container bodies include aluminum-manganese alloys of the AA3000 series and aluminum-magnesium alloys of the AA5000 series. Aluminum alloys suitable for shaping into container end panels include aluminum-magnesium alloys of the AA3000 or AA5000 series and especially the AA5182 and AA5042 alloys.

Aluminum alloys suitable for container end panels such as AA5182 are provided as an ingot or billet or slab by casting. Before working, the ingot or billet is subjected to elevated temperature homogenization. The alloy stock is then hot rolled to provide an intermediate gauge sheet. For example, the material may be hot rolled at a metal entry temperature of about 700-950° F. to provide an intermediate product having a thickness of about 0.130 inch to about 0.190 inch. This material is cold rolled to provide a sheet ranging in thickness from about 0.007 to 0.014 inch We prefer AA5182 aluminum alloy sheet in either the H19 or H39 temper.

Aluminum alloys such as AA5042 are provided as an ingot that is homogenized. This procedure is followed by hot rolling to an intermediate gauge of about 0.125 inch. Typically, the intermediate gauge product is annealed, followed by cold rolling to a final gauge of about 0.007 to 0.014 inch. We prefer AA5042 aluminum alloy sheet in the H2E72 temper.

The aluminum alloy sheet is generally cleaned with an alkaline surface cleaner to remove any residual lubricant adhering to the surface, and then rinsed with water. Cleaning may be avoided if the residual lubricant content is negligible.

A conversion coating is next applied to the sheet to assure good adhesion of the polymer coating and to improve corrosion resistance. Both chrome-containing and chrome-free conversion systems are suitable. The chrome conversion coating generally contains a chromate and a phosphate. Some non-chrome conversion coatings are solutions containing zirconate, titanate, molybdate, tungstate, vanadate, and silicate ions, generally in combination with hydrogen fluoride or other fluorides. The conversion coated sheet may be rinsed with water and then dried before a polymer coating is applied.

The polymer coating applied to the metal sheet is selected from polyolefins, anhydride modified polyolefins, epoxies, and phenoxies, and preferably is an anhydride modified polyolefin. Suitable polyolefins include polypropylene, polyethylene, ethylene-propylene copolymers, propylene-1-hexene copolymers, and mixtures thereof. We prefer polypropylene and copolymers containing propylene and up to about 50 mole percent of a co-monomer. The anhydride modifier may be at least one of maleic anhydride, citraconic anhydride, itaconic anhydride, glutaconic anhydride, 2,3-dimethyl maleic anhydride, and mixtures thereof. The polyolefin is preferably modified with about 0.5-20 weight percent maleic anhydride, more preferably about 0.5-2 weight percent. We especially prefer polyolefins modified with about 1 weight percent maleic anhydride. The polymer in the coating is preferably fully cured. Less preferably the, polymer may be nearly fully cured.

A suitable anhydride modified polypropylene copolymer resin is sold commercially by Basell North American Inc. under the trade designation Pro-fax PF-711. The polymer has a density of about 0.90 g/cm$^3$.

Optionally, the polymer web may contain certain additives including dyes, pigment particles, anticorrosion agents, antioxidants, adhesion promoters, light stabilizers, lubricants, and mixtures thereof.

The polymer coating may be applied to the sheet by any of several techniques, including extrusion coating, slot coating, roll coating, powder coating, laminating, spraying, and electrostatic coating. Extrusion coating is particularly preferred. The polymer coating is preferably extruded onto the metal sheet as a single layer. Alternatively, two or more layers may be coextruded onto the sheet including a tie layer adjacent the metal sheet and one or more overlayers coated over the tie layer. Examples of suitable polymers in the tie layer are anhydride modified polyolefins; ethylene/acrylic acid copolymers such as the copolymers sold by The Dow Chemical Company under the trademark PRIMACOR; and adhesive compositions sold by Rohm & Haas under the trademark MORPRIME. The overlayer preferably comprises a polyolefin, more preferably polypropylene, polyethylene, or a propylene-ethylene copolymer. Other suitable polymers in the overlayer include anhydride modified polyolefins, epoxies, and phenoxies.

Preferably, both sides of an aluminum alloy sheet are extrusion coated with a polymer coating leaving a thickness of about 0.04-0.5 mils (1-13 microns). A polymer coating having a thickness of about 0.4 mils (10 microns) is particularly preferred for can body interiors.

The coating is preferably a fully polymerized material applied by extrusion coating, so that no curing is performed. Subsequent to this application, the fully polymerized, fully cured, coated substrate is exposed to electron beam irradiation to improve the resistance of the polymer coating to feathering angel hair formation. The radiation dose is about 2-20 megarads, and preferably 5-15 megarads. Such irradiation of a fully polymerized material causes chain scission, or chain breaking, in which polymer chain length is decreased and average molecular weight is decreased. One effect of this chain scissioning is an increase in the brittleness of the polymer. Although this increase in brittleness would be a negative attribute for many applications, such as the ductility needs of can sheet for draw-redraw applications, the embrittlement surprisingly provides a positive attribute in reducing the angel hair and feathering in the opening of scored beverage can lids. This electron beam exposure to cause chain scissioning may possibly, in fact, be the same level of irradiation used to originally cure the coating, but when applied after the coating has fully cured will act to break polymer chains rather than initiate cross linking in them.

Optionally, the polymer coating applied to the substrate is uncured or only partially cured. Such coating must first be cured by any of several conventional techniques such as thermal treatment, electron beam irradiation, ultraviolet light, or similar processes.

The irradiated composites are shaped into container end panels or container bodies of food and beverage containers. Easy open end panels for beverages are generally shaped by stamping metal blanks between stamping dies. Container bodies for holding beverages are shaped by a process in which blanks are cupped, wall ironed, bottom domed, necked, and then flanged. Electron beam irradiation to cause polymer chain scissioning is preferably applied after the coated and cured composites are shaped into container end panels or container bodies. Optionally, radiation may be applied to the polymer coated and cured aluminum sheet prior to forming the can ends or bodies.

BRIEF DESCRIPTION OF THE DRAWINGS

FIG. 1 is a flowsheet diagram of a particularly preferred process of the present invention.

DETAILED DESCRIPTION OF PREFERRED EMBODIMENTS

In accordance with the present invention there is provided an AA5182 aluminum alloy sheet in the H19 temper. The sheet thickness is about 7-14 mils (0.18-0.36 mm) and is preferably about 8.6 mils (0.22 mm).

The sheet is cleaned with an alkaline surface cleaner if necessary to remove residual surface lubricant, and rinsed. The cleaned sheet is then conversion coated with an aqueous solution containing chromate and phosphate ions, rinsed again, and dried.

An extrusion coating apparatus of the type shown in Smith et al. U.S. Pat. No. 5,407,702 and Levendusky et al. U.S. Pat. No. 5,919,517 is provided to coat both sides of the aluminum alloy sheet with a polymer coating. The disclosures of both patents are incorporated herein by reference, to the extent consistent with our invention. The metal sheet is heated to a temperature of about 177° C. just prior to coating.

The extrusion coating apparatus applies to the aluminum sheet a coating of a fully polymerized polypropylene copolymer resin having a thickness of approximately 0.4 mil (10 microns). A particularly preferred polypropylene copolymer is sold by Basell North America under the trade designation Pro-fax PF-711. The copolymer resin has a density of about 0.90 g/cm$^3$.

The aluminum-polymer composite is cooled (preferably with water) and dried.

Finally, the polymer coating in the composite is irradiated by an electron beam. A suitable electron beam generator is commercially available from Energy Sciences, Inc. of Wilmingon, Mass. under the trade designation ESI "ELECTROCURE" EB SYSTEM.

Composite specimens were irradiated by an electron beam so that their Pro-fax PF-711 copolymer coatings received 5, 10 and 15 megarad dosages. All composites exhibited feathering and angel hair formation before irradiation. Angel hair formation was reduced in the 5 and 10 megarad specimens and virtually eliminated in the 15 megarad specimens. Feathering was virtually eliminated by a 10 megarad exposure. For comparison, specimens of the same composite were exposed to various doses of ultraviolet (UV) radiation. The UV radiation did not reduce angel hair formation or feathering at exposures practical for manufacturing purposes.

Composites made up of AA5182 aluminum alloy sheet coated with polyethylene terephthalate (PET) resin webs were also subjected to 5, 10 and 15 megarad doses of electron beam radiation and various doses of UV radiation. The electron beam radiation had no beneficial effect on feathering or angel hair formation in the aluminum-PET composites at the exposure levels tested. The UV radiation required longer time exposures than practical for manufacturing purposes.

The foregoing disclosure of our invention has been made with reference to some particularly preferred embodiments. Persons skilled in the art will understand that numerous changes and modifications can be made without departing from the spirit and scope of the following claims.

What is claimed is:

1. A process for making a metal-polymer composite suitable for shaping into food and beverage container end panels and container bodies, comprising:
   a. applying to a metal sheet a top layer comprising a fully polymerized or nearly fully polymerized polymer selected from the group consisting of polyolefins, anhydride-modified polyolefins, epoxies, and phenoxies; and
   b. scissioning polymer chains in said polymer by irradiating said top layer, wherein irradiating said top layer comprises directly exposing the top layer to radiation, wherein said irradiating is carried out at a sufficient energy and for a sufficient time to sufficiently embrittle said polymer in said top layer thereby to improve resistance of said top layer to feathering and angel hair formation.

2. The process of claim 1 wherein said metal sheet comprises a metal selected from the group consisting of aluminum alloys, steel, aluminum alloy-coated steel, and aluminum-coated steel.

3. The process of claim 1 wherein said metal sheet comprises aluminum alloy of the AA3000 or AA5000 series.

4. The process of claim 1 wherein said polymer comprises a polyolefin selected from the group consisting of polypropylene, polyethylene, propylene-ethylene copolymers, propylene-1-hexene copolymers, and mixtures thereof.

5. The process of claim 1 wherein said polymer comprises a polyolefin selected from the group consisting of polypropylene and copolymers comprising propylene and up to about 50 mole percent of a co-monomer.

6. The process of claim 1 wherein said polymer comprises a polyolefin modified with an anhydride selected from the group consisting of maleic anhydride, citraconic anhydride, itaconic anhydride, glutaconic anhydride, 2,3-dimethylmaleic anhydride, and mixtures thereof.

7. The process of claim 1 wherein said polymer comprises a polyolefin modified with about 0.5-20 weight percent maleic anhydride, based on the weight of the polyolefin.

8. The process of claim 1 wherein the step of applying the polymer top layer to the metal sheet comprises extrusion coating, roll coating, or laminating.

9. The process of claim 1 wherein the step of irradiating comprises irradiating at a dosage of about 2-20 megarads.

10. The process of claim 1 wherein said polymer in said top layer is fully cured before said step of irradiating.

11. The process of claim 1 further comprising d. before step a., conversion coating a surface portion of said metal sheet.

12. A process for making an aluminum-polymer composite suitable for shaping into container end panels having improved resistance to feathering and angel hair formation, comprising:
   a. applying to an aluminum alloy sheet a cured polymer top layer comprising a fully polymerized maleic anhydride modified polyolefin, said polyolefin being selected from the group consisting of polypropylene and copolymers comprising propylene and up to about 50 mole percent of a co-monomer, thereby to form an aluminum-polymer composite;
   b. scissioning chains in said maleic anhydride modified polyolefin by irradiating the cured polymer top layer on said composite, wherein irradiating the cured polymer top layer comprises directly exposing the top layer to radiation, wherein said irradiating sufficiently embrittles said polymer top layer thereby to improve resistance of the top layer to feathering and angel hair formation; and c. shaping said composite into a container body or container end panel;

wherein step b. is performed before step c.

13. A process for making a metal-polymer composite suitable for shaping into food and beverage container end panels and container bodies, comprising:
  a. applying to a metal sheet a top layer comprising a fully polymerized or nearly fully polymerized polymer selected from the group consisting of polyolefins, anhydride-modified polyolefins, epoxies, and phenoxies;
  b. scissioning polymer chains in said polymer by irradiating said top layer, wherein irradiating said top layer comprises directly exposing the top layer to radiation, wherein said irradiating is carried out for a sufficient time to embrittle said polymer in said top layer, thereby to improve resistance of said top layer to feathering and angel hair formation; and c. shaping said composite into a container body or container end panel;

wherein step b. is performed before step c.

14. A process for making a metal-polymer composite suitable for shaping into food and beverage container end panels and container bodies, comprising:
  a. applying to a metal sheet a top layer comprising a fully polymerized or nearly fully polymerized polymer selected from the group consisting of polyolefins, anhydride-modified polyolefins, epoxies, and phenoxies;
  b. embrittling said polymer in said layer, thereby to improve resistance of said top layer to feathering and angel hair formation wherein embrittling said polymer comprises directly exposing the fully polymerized or nearly fully polymerized polymer to radiation.

* * * * *